United States Patent [19]

Stubbings

[11] 4,195,407
[45] Apr. 1, 1980

[54] POWER SHEAR YOKE CONSTRUCTION AND BALL-BEARING ASSEMBLY

[75] Inventor: James H. Stubbings, Rockville, Md.

[73] Assignee: Potomac Applied Mechanics, Inc., Bethesda, Md.

[21] Appl. No.: 940,852

[22] Filed: Sep. 8, 1978

[51] Int. Cl.² .............................................. B26B 15/00
[52] U.S. Cl. ...................................................... 30/228
[58] Field of Search ................. 30/228, 241, 242, 243, 30/273, 274, 275; 83/648

[56] References Cited
U.S. PATENT DOCUMENTS

| | | | |
|---|---|---|---|
| 1,164,669 | 12/1915 | Steinman | 30/273 |
| 2,728,141 | 12/1955 | Green | 30/273 |
| 3,172,203 | 3/1965 | Johnson | 30/228 |
| 3,631,596 | 1/1972 | Glaus | 30/228 |

*Primary Examiner*—Jimmy C. Peters

*Attorney, Agent, or Firm*—Cushman, Darby & Cushman

[57] ABSTRACT

A yoke construction for a power shear and a ball-bearing assembly are provided that allow easier cutting of sheet metal with the shear. The yoke includes an arm having upper and lower surfaces, with a ball bearing mounted in the lower surface for universal rotation with respect to the arm, the ball bearing engaging the top of a work table to allow easier pivoting of the shear during cutting. Also, a plurality of ball bearings may be provided on the arm upper surface for engaging the work piece. The ball bearings are mounted by a rigid support member having a generally conical end portion with a generally pointed tip, the tip providing a bearing surface for the ball bearing and urging it against a lip formed in the surface from which the ball bearing extends. The ball bearing mounting assembly may be provided as an insert.

14 Claims, 5 Drawing Figures

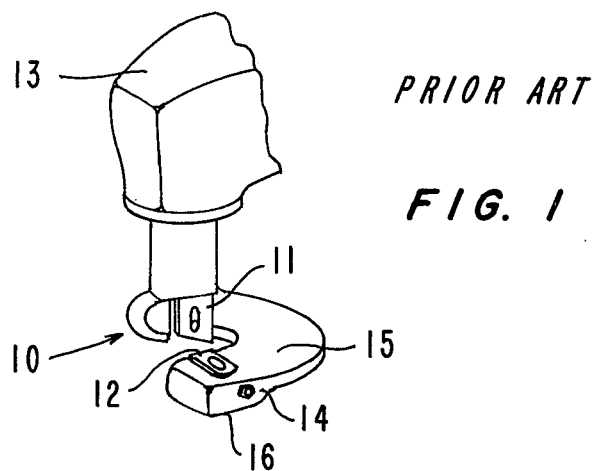
PRIOR ART
FIG. 1
FIG. 2
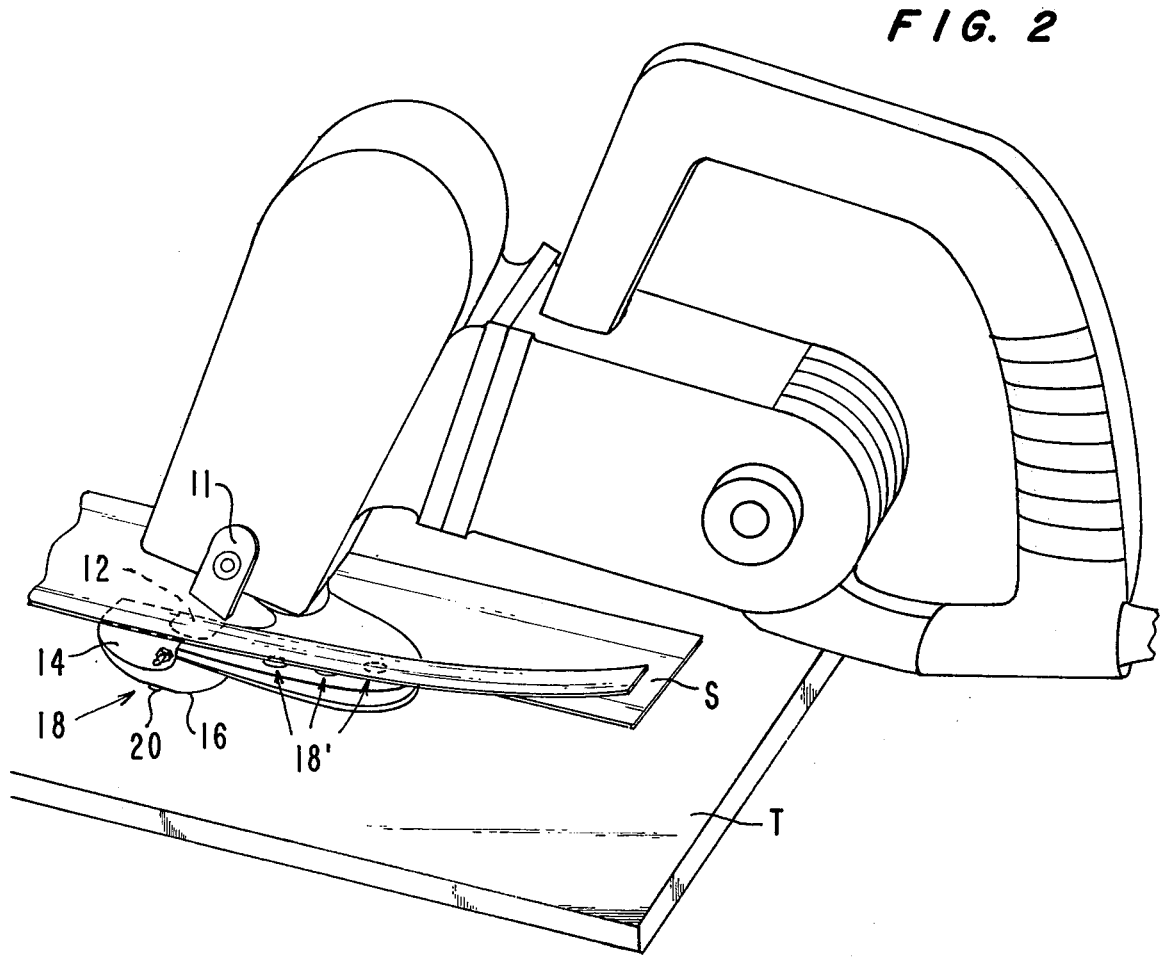

POWER SHEAR YOKE CONSTRUCTION AND BALL-BEARING ASSEMBLY

BACKGROUND AND SUMMARY OF THE INVENTION

U.S. Pat. No. 4,069,583, and copending application Ser. No. 801,389, filed May 27, 1977 show an improved arrangement for a conventional sheet metal cutting shear. In U.S. Pat. No. 4,069,583 it was recognized that binding of a power shear during cutting of arcs and the like (both with a hand-operated tool, or with a machine-moved tool) occurs because of contact of the metal sheet being cut with the yoke arm mounting the lower blade of the shear. That problem was solved by providing a ball bearing on the upper surface of the yoke arm. It has now also been found that the problem of binding during making arcuate cuts with a conventional power shear also can be due in part, especially when relatively heavy sheet metal is being cut, to binding of the yoke arm lower surface with the table or like working surface on which the sheet metal is disposed. Also, it has been found that it is desirable to ensure no movement of the ball bearings during cutting except universal rotatable movement, in order to provide maximum binding-reducing capability.

According to the present invention, a yoke construction is provided for a conventional power shear which includes one or more ball bearings mounted on the lower surface of the yoke arm, adapted to engage the table or other working surface on which cutting is practiced, the ball bearing allowing easier pivoting of the cutting tool during cutting to change the direction of cutting. Additionally, according to the present invention, a plurality of ball bearings may be provided in the yoke arm upper surface for engaging the lower surface of the metal sheet being cut during cutting, the ball bearings preferably disposed in an arc outside of and behind the trailing edge of the lower cutting blade (which is mounted by the yoke arm). Further, according to the present invention, a ball bearing mounting assembly has been provided that allows almost friction-free relative rotatable movement between the ball bearing and the surface with which it is associated, but does not allow any other movement. The ball bearing mounting assembly includes a lip formed in the surface through which the ball bearing extends, and a rigid support member having a generally conical end portion with a generally pointed tip in direct contact with the ball bearing, urging it against the lip. Preferably the rigid support member is cold rolled steel, and the mounting arrangement can be provided as an insert.

It is the primary object of the present invention to provide an improved yoke construction for power shears that allow easier pivoting of the cutting tool during cutting to change the direction of cutting, and an improved ball bearing mounting assembly. This and other objects of the invention will become clear from an inspection of the detailed description of the invention, and from the appended claims.

BRIEF DESCRIPTION OF THE DRAWINGS

FIG. 1 is a detail perspective view of a conventional prior art power shear;

FIG. 2 is a side view showing a power shear with a yoke construction according to the present invention, in use;

DETAILED DESCRIPTION OF THE INVENTION

Figure 3:
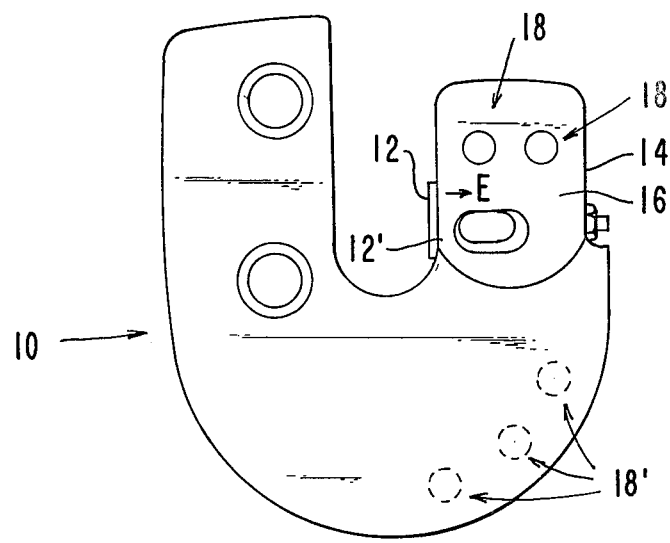
FIG. 3 is a bottom plan view of a yoke construction according to the invention.

An exemplary prior art power metal cutting shear over which the present invention is an improvement is illustrated in FIG. 1. The invention may be practiced with any conventional power shear, such as a Black & Decker Model No. 3210, a Stanley Unishear U212, or the like. Such shears include a yoke assembly 10 comprising an upper blade 11 adapted to be disposed the surface of a horizontally disposed metal sheet to be cut, a lower blade 12 adapted to be disposed below the surface of a horizontally disposed metal sheet to be cut, an electric motor or like power source in casing 13 for moving at least one of the blades 11, 12 with respect to the other to effect cutting of the metal sheet, an arm 14 of the yoke assembly mounting the lower blade 12 in position below the sheet, the arm having an upper surface 15 and a lower surface 16, and other conventional components. In U.S. Pat. No. 4,069,583, and copending application Ser. No. 801.389, filed May 27, 1977, a ball bearing is provided in the upper surface 15 of the arm 14 of such a cutter to engage the bottom of a metal sheet during cutting to facilitate pivoting of the cutting tool during cutting to change the direction of cutting, and to prevent binding of the tool and the sheet.

According to the present invention, with particular reference to FIGS. 2 and 3, the pivoting movement of the cutting tool during cutting, especially for cutting heavier gauge metals, and the prevention of binding are further facilitated by providing a ball-bearing assembly 18 associated with the lower surface 16 of the yoke arm 14. [The term "ball bearing" as used in the specification and claims is intended to encompass all equivalent devices that have substantially universal rotatable movement and are capable of accomplishing the objectives according to the invention.] As shown in FIG. 3, a plurality of such ball-bearing assemblys may be provided. Each ball-bearing assembly 18, as shown most clearly in FIGS. 4 and 5, comprises a ball bearing 20 and means 22 for mounting the ball bearing 20 in the yoke arm 14 or like rigid body member having substantial thickness. The preferred ball-bearing mounting means 22 which is actually illustrated in FIGS. 4 and 5 allows universal relative rotation of the ball bearing 20 with respect to the member 14, but does not allow any other type of movement, so that it securely enages any surface against which it is pressed, while still rotating essentially friction free. FIG. 2 shows the ball bearing 20 of an assembly 18 engaging a table top T, or like working surface on which cutting is practiced.

According to another aspect of the present invention, the upper surface 15 of the yoke arm 14 may be provided with a plurality of ball-bearing assemblies 18', shown in FIG. 2 and shown in dotted line in FIG. 3. The arrangement of a plurality of such ball bearings facilitates the easy pivoting of the cutting tool during cutting and minimizes binding. As shown most clearly in FIG. 3, the plurality of assemblies 18' may be disposed in an arc generally outside of (in direction E) and behind the trailing edge 12' of the lower blade 12.

Figure 4:
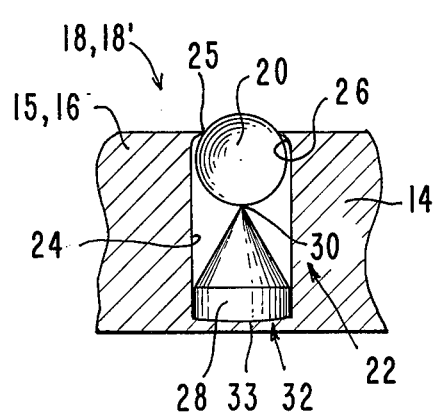
FIG. 4 is a side view partly in cross-section and partly in elevation showing an exemplary ball-bearing mounting assembly according to the invention.
Figure 5:
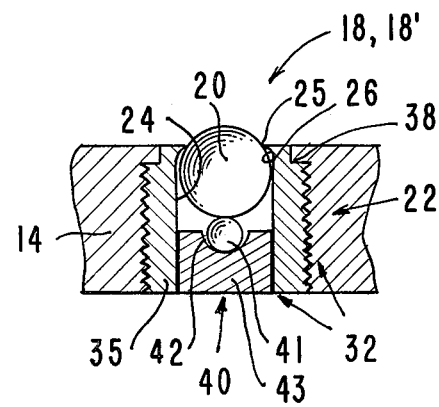
FIG. 5 is a view similar of FIG. 4 showing a modified form of exemplary ball bearing mounting assembly according to the invention.

Details of preferred ball bearing mounting assemblies 22 according to the present invention are shown in FIGS. 4 and 5. The mounting means 22 include means defining a bore 24 in the thickness of the member 14, the bore 24 extending generally perpendicularly to the surface 15, 16, the bore 24 having a diameter greater than the diameter of the ball bearing 20 except at the surface 15, 16. An opening 25 concentric with the bore 24 is provided in the surface 15, 16, the opening having a smaller diameter than the ball bearing 20, a lip 26 defining the opening 25. Supporting means for supporting the ball bearing 20 for universal rotatable movement and for urging the ball bearing against the lip 26—in the FIG. 4 embodiment—comprises a rigid support member 28 having a generally conical end portion with a generally pointed tip 30 in direct contact with the ball bearing 20. Member 28 is preferably made of cold rolled steel, or like hard material. Means 32 are provided for maintaining the support member 28 in a predetermined position with respect to the body 14, at which position the ball bearing 20 is properly supported. In the FIG. 4 embodiment, the means 32 comprise a weld 33.

In the modified arrangement 22' of FIG. 5, the means defining the bore 24 comprises an insert 35, the lip 26 being an integral part of insert 35. A support mechanism 40 is provided in place of the member 28 of the FIG. 4 embodiment, the mechanism including a support member 43 having a depression 42 formed therein for receipt of an accessory ball bearing 41. The accessory ball bearing 41 directly engages the ball bearing 20, positively supporting it for rotation but not other movement. An insert may be provided for the member 28 also, if desired. Member 43 is integral with the insert 35, and the means 32 for maintaining the support member 43 in a predetermined position with respect to the member 14 comprises external threads formed on the insert and cooperating with corresponding internal threads formed in a passageway through the member 14, as clearly shown in FIG. 5. An abutment portion 38 of the member 14 preferably is also provided to limit the movement of the insert 35 toward the surface 15, 16 of the member 14.

In utilizing a power shear as modified according to the present invention, the power means 13 is operated to reciprocate the blade 11 with respect to the lower blade 12, and the blades 11, 12 are moved into operative contact with a piece of sheet metal S (see FIG. 2), a portion S' being severed from the main body of the sheet during cutting. The ball bearings of the assemblies 18' engage the lower surface of the sheet metal portion S', and thus minimize binding and provide for easier pivoting of the cutting tool during cutting, while the ball bearing of the ball-bearing assembly 18 engages the table top T to further facilitate pivoting during cutting and to minimize binding. The engagement of tip portion 30 of rigid support member 28 of the ball bearing 20 mounting means 22 presses the ball bearing 20 into engagement with the lip portion 26 of member 14, and allows essentially friction-free rotation of the ball bearing 20 with respect to the member 14, while not allowing significant movement in any other mode or direction.

It will thus be seen that according to the present invention an improved yoke construction for a power shear or the like, and an improved ball-bearing mounting assembly, have been provided. While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and devices.

What is claimed is:

1. A ball bearing mounting assembly comprising
   a rigid body member having a first surface, and having substantial thickness in the area thereof defining said first surface;
   a ball bearing;
   means defining a bore in said rigid member in the thickness thereof and extending generally perpendicularly to said first surface, the bore having a diameter greater than the diameter of said ball bearing except at said first surface, an opening concentric with said bore in said first surface being provided, the oapening in said first surface having a smaller diameter than said ball bearing, a lip being provided defining said opening in said first surface;
   supporting means for said ball bearing for supporting said ball bearing for universal rotatable movement and for urging said ball bearing against said lip, said supporting means comprising a rigid support member having a generally conical end portion with a generally pointed tip portion, said tip portion being in direct contact with said ball bearing; and
   means for maintaining said rigid support member in a predetermined position with respect to said rigid body member.

2. An assembly as recited in claim 1 wherein said means defining said bore comprises an insert, said lip providing an integral part of said insert.

3. An assembly as recited in claim 2 wherein said rigid support member is integral with said insert, and wherein said means for maintaining said rigid support member in a predetermined position with respect to said rigid body member comprises external threads formed on said insert and cooperating with internal threads formed in a passageway through said rigid body member.

4. An assembly as recited in claim 1 wherein said means for maintaining said rigid support member in a predetermined position with respect to said body member comprises a weld between said support member and said body member.

5. An assembly as recited in claim 1 wherein said rigid support member is cold rolled steel.

6. In a sheet metal tool comprising an upper blade adapted to be disposed above the surface of a horizontally disposed metal sheet to be cut; a lower blade adapted to be disposed below the surface of a horizontally disposed metal sheet to be cut, and having leading and trailing edges; means for moving at least one of said blades with respect to the other to effect cutting of the metal sheet; and an arm mounting said lower blade in position below said sheet, said arm having an upper surface with which said lower blade is operatively associated, a ball bearing and means for mounting said ball bearing on said arm for universal rotatable movement with respect to said arm and so that a portion of said ball bearing extends outwardly from said arm upper surface so that it engages the bottom surface of a metal sheet during cutting with said tool, to allow easier pivoting of said tool during cutting to change the direction of cutting; wherein the improvement comprises said means for mounting said ball bearing comprising means defining a bore in said arm in the thickness thereof and extending generally perpendicularly to said upper surface, the bore having a diameter greater than the diameter of said ball bearing except at said upper surface, an opening concentric with said bore in said upper surface being provided, the opening in said upper surface having a smaller diameter than said ball bearing, a lip being provided defining said opening in said first surface;

supporting means for said ball bearing for supporting said ball bearing for universal rotatable movement and for urging said ball bearing against said lip, said supporting means comprising a rigid support member having a generally conical end portion with a generally pointed tip portion, said tip portion being in direct contact with said ball bearing; and means for maintaining said rigid support member in a predetermined position with respect to said arm.

7. In a tool as recited in claim 6 wherein the improvement further comprises said means defining said bore comprising an insert, said lip providing an integral part of said insert.

8. In a tool as recited in claim 6 wherein the improvement further comprises said rigid support member being cold rolled steel.

9. In a sheet metal tool comprising an upper blade adapted to be disposed above the surface of a horizontally disposed metal sheet to be cut; a lower blade adapted to be disposed below the surface of a horizontally disposed metal sheet to be cut, and having leading and trailing edges; means for moving at least one of said blades with respect to the other to effect cutting of the metal sheet; and an arm mounting said lower blade in position below said sheet, said arm having an upper surface with which said lower blade is operatively associated, a ball bearing and means for mounting said ball bearing on said arm for universal rotatable movement with respect to said arm and so that a portion of said ball bearing extends outwardly from said arm upper surface so that it engages the bottom surface of a metal sheet during cutting with said tool, to allow easier pivoting of said tool during cutting to change the direction of cutting; wherein the improvement comprises a plurality of ball bearings and associated means for mounting said ball bearings for universal rotatable movement with respect to said arm and so that a portion of each of said ball bearings extends outwardly from said arm upper surface so that it may engage the bottom surface of a metal sheet during cutting with said tool, to allow easier pivoting of said tool during cutting to change the direction of cutting.

10. In a tool as recited in claim 9 wherein the improvement further comprises said plurality of ball bearings arranged in an arc outside of and behind the trailing edge of said lower blade.

11. In a tool as recited in claim 9 wherein the improvement further comprises said means for mounting each said ball bearing comprising means defining a bore in said arm in the thickness thereof and extending generally perpendicularly to said lower surface, the bore having a diameter greater than the diameter of said ball bearing except at said lower surface, a lip defining an opening in said lower surface being provided;

supporting means for supporting said ball bearing for universal rotatable movement and for urging said ball bearing against said lip, said supporting means comprising an accessory ball bearing, and a support member having a depression formed therein for receipt of said accessory ball bearing; and means for maintaining said support member in a predetermined position with respect to said rigid arm.

12. In a tool as recited in claim 9 wherein the improvement further comprises said means for mounting each said ball bearing comprising means defining a bore in said arm in the thickness thereof and extending generally perpendicularly to said lower surface, the bore having a diameter greater than the diameter of said ball bearing except at said lower surface, an opening concentric with said bore in said lower surface being provided, the opening in said lower surface having a smaller diameter than said ball bearing, a lip being provided defining said opening in said first surface;

supporting means for said ball bearing for supporting said ball bearing for universal rotatable movement and for urging said ball bearing against said lip, said supporting means comprising a rigid support member having a generally conical end portion with a generally pointed tip portion, said tip portion being in direct contact with said ball bearing; and means for maintaining said rigid support member in a predetermined position with respect to said arm.

13. In a tool as recited in claim 12 wherein the improvement further comprises said means defining said bore comprising an insert, said lip providing an integral part of said insert.

14. A ball bearing mounting assembly comprising a rigid body member having a first surface, and having substantial thickness in the area thereof defining said first surface;

a ball bearing;

means defining a bore in said rigid member in the thickness thereof and extending generally perpendicularly to said first surface, the bore having a diameter greater than the diameter of said ball bearing except at said first surface, an opening concentric with said bore in said first surface being provided, the opening in said first surface having a smaller diameter than said ball bearing, a lip being provided defining said opening in said first surface;

supporting means for said ball bearing for supporting said ball bearing for universal rotatable movement and for urging said ball bearing against said lip, said supporting means comprising an accessory ball bearing, and a support member having a depression formed therein for receipt of said accessory ball bearing; and means for maintaining said support member in a predetermined position with respect to said rigid body member.

* * * * *